H. BAUGHMAN.
Improvement in Corn-Planters.
No. 114,390.  Patented May 2, 1871.
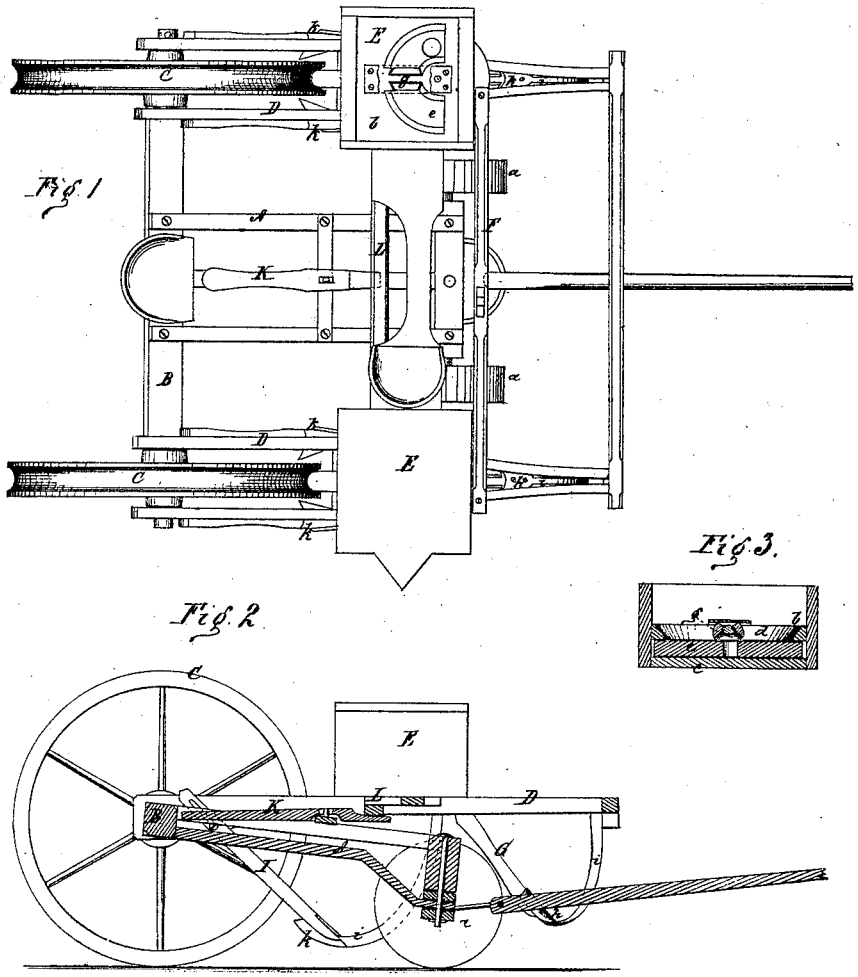
Witnesses:  
Inventor:  
H Baughman.  
PER  
Attorneys.

United States Patent Office.

HENRY BAUGHMAN, OF SANDUSKY, OHIO.

Letters Patent No. 114,390, dated May 2, 1871.

IMPROVEMENT IN CORN-PLANTERS.

The Schedule referred to in these Letters Patent and making part of the same.

*To all whom it may concern:*

Be it known that I, HENRY BAUGHMAN, of Sandusky, in the county of Erie and State of Ohio, have invented a new and improved Corn-Planter; and I do hereby declare the following to be a full, clear, and exact description of the same, reference being had to the accompanying drawing making a part of this specification, in which—

Figure 1 is a top view.
Figure 2 is a front elevation.
Figure 3 is a section of one of the seed-boxes.

This invention relates to improvement in corn-planters, and consists in a certain combination of parts which are hereinafter described, in connection with others, forming a complete operative machine, and are specifically stated in the claim.

Referring to the drawing—

A is the main frame.

B, the axle which supports its rear end.

C C, the transporting-wheels.

$a\ a$, the trucks which carry the front end of the frame A.

D is the plow-frame hinged to the axle, and carrying seed-boxes E. These seed-boxes have each a false bottom, $b$, and a true bottom, $c$.

In the false bottoms are curved openings $d$.

Between the false and true bottoms are disks $e$, each of which has two vertical openings through it.

Through each of the false bottoms there is a single opening.

The two disks $e$ are connected by a bar, F, which has a handle, $f$, to be used for vibrating the disks $e$.

The true bottoms prevent the seed from falling through the openings in the disks, except when the latter coincide with the openings in said true bottoms.

The false bottoms collect seed in their openings $d$, from which it falls into the pockets of the disks as the latter vibrate under the action of the reciprocating-bar.

Across each opening $d$ is placed a block, $g$, to prevent seed from the former from falling through the disk pockets when the same coincide with the holes in the true bottoms.

G are plow-standards, bearing shovels $h$, which open furrows.

Curved bars $i$ connect the points of the shovels $h$ with the frame D, and operate as colters.

I are standards attached in rear of the standards G, one to each side of each of the latter.

The standards I bear half-shovels $k$, which throw dirt inward and operate as coverers.

The half-shovels are also combined with curved colters $i$.

A lever, K, having its fulcrum in the frame A, has its point under a cross-bar, L, of the frame D, and its rear end near the driver's seat.

By depressing said lever the driver is enabled to raise the frame D and throw the plows out of the earth whenever desired.

Having thus described my invention,

What I claim as new, and desire to secure by Letters Patent, is—

The combination of the false bottom $b$, provided with the curved opening $d$, the dropper $e$, true bottom $c$, and block $g$, as specified.

HENRY BAUGHMAN.

Witnesses:
H. B. RAMSDELL,
JOHN C. ERNST.